United States Patent
Mourya et al.

(10) Patent No.: US 9,253,313 B2
(45) Date of Patent: Feb. 2, 2016

(54) METHOD TO MANAGE MULTIPLE CALLER IDENTITIES IN A TELECOMMUNICATION SYSTEM

(75) Inventors: Manoj Mourya, Fremont, CA (US); Ndiata Kalonji, Saint Jacques de la Lande (FR)

(73) Assignee: Orange, Paris (FR)

(*) Notice: Subject to any disclaimer, the term of this patent is extended or adjusted under 35 U.S.C. 154(b) by 365 days.

(21) Appl. No.: 13/002,037

(22) PCT Filed: Jun. 29, 2009
(Under 37 CFR 1.47)

(86) PCT No.: PCT/IB2009/053237
§ 371 (c)(1),
(2), (4) Date: Dec. 29, 2010

(87) PCT Pub. No.: WO2010/001370
PCT Pub. Date: Jan. 7, 2010

(65) Prior Publication Data
US 2011/0194680 A1    Aug. 11, 2011

(51) Int. Cl.
*H04M 1/56* (2006.01)
*H04M 3/42* (2006.01)

(52) U.S. Cl.
CPC ...... *H04M 3/42042* (2013.01); *H04M 3/42153* (2013.01); *H04M 3/42059* (2013.01)

(58) Field of Classification Search
CPC .............................. H04M 1/576; H04M 1/57
USPC ................ 379/88.19, 88.21, 127.06, 142.04, 379/142.06, 142.1, 207.15
See application file for complete search history.

(56) References Cited

U.S. PATENT DOCUMENTS

| | | | |
|---|---|---|---|
| 2004/0266415 A1* | 12/2004 | Belkin et al. | 455/415 |
| 2006/0177029 A1* | 8/2006 | Dotan et al. | 379/114.01 |
| 2007/0105531 A1 | 5/2007 | Schroeder | |

OTHER PUBLICATIONS

International Search Report and Written Opinion dated Nov. 6, 2009 for corresponding International Patent Application No. PCT/IB2009/053237 filed Jul. 29, 2009, 15 pages.

* cited by examiner

*Primary Examiner* — Yosef K Laekemariam
(74) *Attorney, Agent, or Firm* — David D. Brush; Westman, Champlin & Koehler, P.A.

(57) ABSTRACT

In a telecommunication system, providing to a recipient end point a caller identification (CID) from a calling end point, the calling end point including a default CID and at least one additional CID, the method includes receiving a call setup message from the calling end point, the call setup message including the additional CID, allocating a temporary end point for the call, from a pool of available end points, sending contact data for the allocated temporary end point to the calling end point, processing a first call received from the calling end point to the temporary end point, processing a second call to the recipient end point using the additional CID as the calling CID, and joining the first and second calls to generate a call from the calling end point to the recipient end point.

13 Claims, 4 Drawing Sheets

METHOD TO MANAGE MULTIPLE CALLER IDENTITIES IN A TELECOMMUNICATION SYSTEM

FIELD OF THE PRESENT SYSTEM

The present invention generally relates to communications using mobile devices in telecommunication networks, and more specifically to enhanced communications services.

BACKGROUND OF THE PRESENT SYSTEM

Mobile phones have become important devices in our daily life. A mobile phone or device is generally a subscriber to a telecommunication network in order to enjoy communication services, such as voice, data, . . . . A mobile user is generally identified using an International Mobile Subscriber Identity, or IMSI. The mobile IMSI is a unique number associated with all GSM (Global System for Mobile communications) and Universal Mobile Telecommunications System (UMTS) network mobile phone users. It is stored in the Subscriber Identity Module (SIM) inside the phone. The SIM is actually unique to one subscriber and carries information to identify that subscriber in his home network, i.e. the network he is a subscriber of. This information includes the IMSI, further authentication data, and other data. The SIM is generally provided by the network operator when a user gets his subscription, and corresponds on this network to a unique MSISDN (Mobile Station International Subscriber Directory Number) which is actually the mobile device phone number in this network.

With the success of mobile telephony, and more generally with the multiplicity of enhanced communication services, each user today ends up associated with more than one communication devices, and consequently as many phone numbers—home, work, mobile, . . . .

Several recent developments have appeared to easy the user's burden in handling his numerous devices and/or phone numbers.

SIM cards carrying multiple subscriber identities are now available. Users can switch between subscriber identities using one single mobile device to register with different networks. One downfall with such a solution is that the user still has as many phone numbers as existing subscriber identities in his SIM card. Furthermore, as only one subscriber identity can be active at a time, call forwarding solutions are needed when a call involves the MSISDN of an inactive subscriber identity, i.e. an inactive MSISDN. For instance, when the user with multiple subscriber identities places a call to a recipient device using one of his inactive MSISDNs, a complex solution will be needed to use this inactive MSISDN as the caller Identification (CID).

Presenting the Caller Identification is a fairly recent service provided by most if not all network operators to their subscribers. For instance Caller ID (CID) corresponds to the service offered the PSTN (Public Switched Telephone Network). CLIP (Calling Line Identification Presentation), a similar service offered for GSM mobile devices, is described in the document 3GPP (3rd Generation Partnership Project) TS23.081. Different solutions are available to transmit the caller ID information to the recipient device, for instance an SS7 (Signaling System 7) message for PSTN lines or an SIP (Session Initiation Protocol) message setup in GSM and UMTS networks for Voice over IP. The presented Caller ID is generally the subscriber Caller ID, here after referred to as the default Caller ID.

Changing the Caller ID for a calling device would allow to manage multiple Caller IDs through only one device. A user could place a call using his office, mobile, home, . . . called ID without the need of all the corresponding devices.

Solutions are known to present to a recipient device a Caller ID different than the default Caller ID. US2007105531S discloses a mobile device with a single SIM—and corresponding MSISDN—that is allocated with other MSISDNs. The mobile device, when sending a call setup message for calling a recipient device, passes on its IMSI number for authentication as well as one of the allocated MSISDN as the caller ID. As the call setup message is sent to the MSC (Mobile Switching Center), the MSC must support this additional parameter, and be modified accordingly. This additional field is not provided in the existing standards, and such a modification would require a heavy reconfiguration of all MSCs to be supported.

Today there is still a need for a simple solution that allows an efficient management of a user's plurality of Caller IDs. There is a further need for a service continuity when a user with multiple Caller IDs receives a call.

SUMMARY OF THE PRESENT SYSTEM AND METHOD

It is an object of the present system, processor and method to overcome disadvantages and/or make improvements in the prior art.

To that extent, the present method proposes a method for providing to a recipient end point a caller identification (CID) from a calling end point, the calling end point including a default CID and at least one additional CID. The method includes receiving a call setup message from the calling end point, the call setup message comprising the additional CID, sending contact data for a temporary end point allocated to the calling end point, processing a first call from the calling end point to the temporary end point, processing a second call to the recipient end point using the additional CID as the calling CID, and joining the first and second calls to generate a call from the calling end point to the recipient end point.

The calling end point may include a default CID and at least one additional CID. The calling end point may be arranged to select one additional Caller ID, send a call setup message, the call setup message including the selected additional CID, receive contact data for an allocated temporary end point, and call the temporary end point.

A profile service platform in accordance with the present system for providing to a recipient end point a caller identification (CID) from a calling end point, the calling end point may include a default CID and at least one additional CID. The profile service platform may be arranged to receive a call setup message from the calling end point, the call setup message comprising the additional CID, send contact data for a temporary end point allocated to the calling end point, process a first call from the calling end point to the temporary end point, process a second call to the recipient end point using the additional CID as the calling CID, and join the first and second calls to generate a call from the calling end point to the recipient end point.

Thanks to the present invention, a method is provided to process a call between a calling end point with multiple Caller IDs and a recipient end point. The temporary end point allocated to this call allows to build the communication path between these two end points using switching centers. The call setup message is the message triggering the present method, and it comprises the necessary parameters to process the two call using the allocated temporary end point.

A telecommunication system in accordance with the present system may include a recipient end point, a calling end point, the calling end point comprising a default CID and at least one additional CID, and a profile service platform for providing to the recipient end point a caller identification (CID) from the calling end point. The calling end point may be arranged to select one additional Caller ID, send a call setup message to the profile service platform, the call setup message including the selected additional CID, receive contact data for an allocated temporary end point, and call the temporary end point. The profile service platform may be arranged to receive the call setup message from the calling end point, send contact data for a temporary end point allocated to the calling end point, process the first call from the calling end point to the temporary end point, process a second call to the recipient end point using the additional CID as the calling CID, and join the first and second calls to generate a call from the calling end point to the recipient end point.

An application embodied on a computer readable medium in accordance with the present system may be arranged to provide to a recipient end point a caller identification (CID) from a calling end point, the calling end point including a default CID and at least one additional CID. The application may include a portion to receive a call setup message from the calling end point, the call setup message comprising the additional CID, a portion to send contact data for a temporary end point allocated to the calling end point, a portion to process a first call from the calling end point to the temporary end point, a portion to process a second call to the recipient end point using the additional CID as the calling CID, and a portion to join the first and second calls to generate a call from the calling end point to the recipient end point.

An application embodied on a computer readable medium in accordance with the present system may be arranged to provide to a recipient end point a caller identification (CID) from a calling end point, the calling end point including a default CID and at least one additional CID. The application may include a portion to select one additional Caller ID, a portion to send a call setup message, the call setup message comprising the selected additional CID, a portion to receive contact data for an allocated temporary end point, and a portion to call the temporary end point.

BRIEF DESCRIPTION OF THE DRAWINGS

The present system, call management node and method are explained in further detail, and by way of example, with reference to the accompanying drawings wherein.

DETAILED DESCRIPTION OF THE PRESENT SYSTEM AND METHOD

Figure 1:
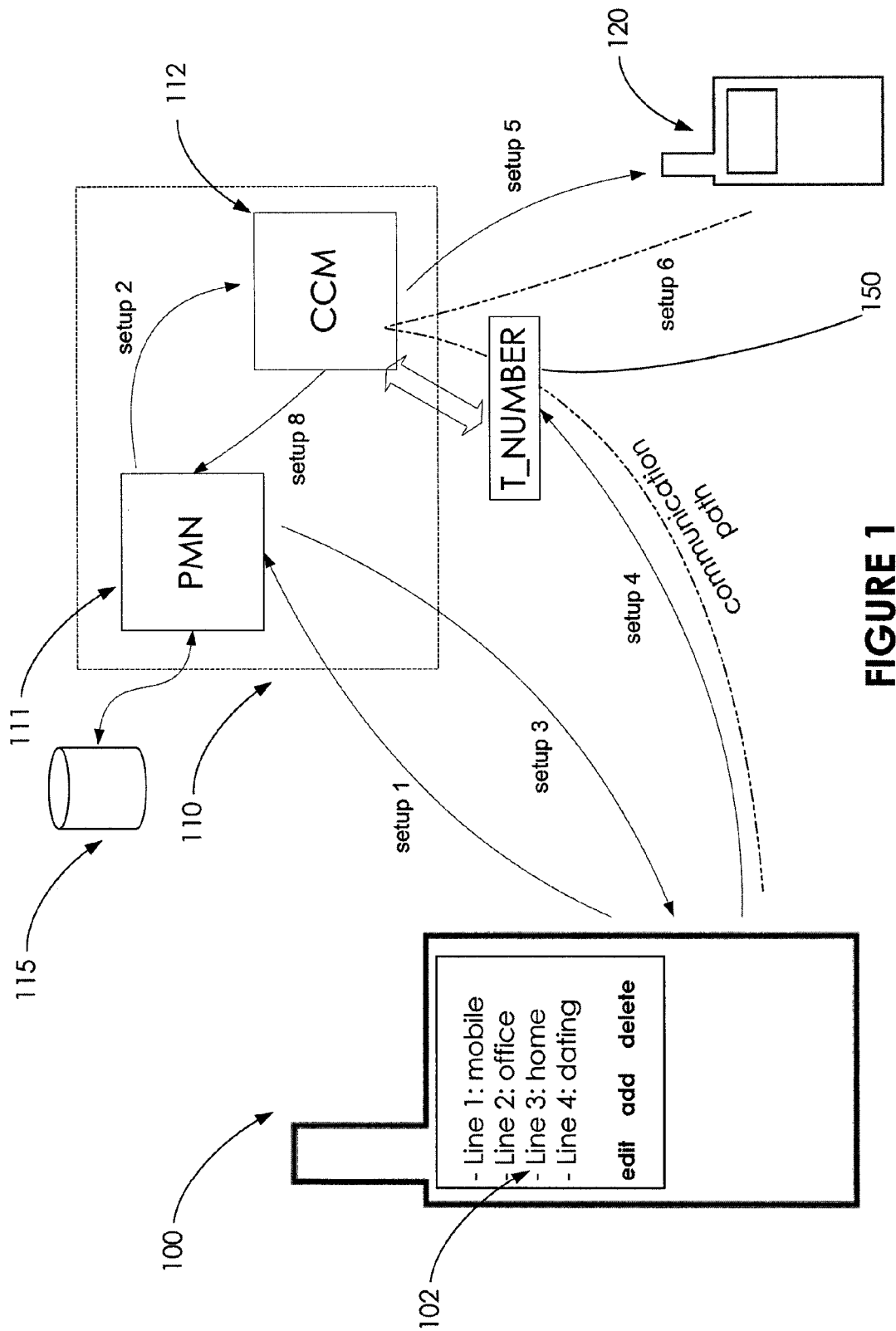
FIG. 1 shows an illustrative embodiment of the present system.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

Unless specified otherwise, the exemplary embodiment will be described hereafter in its application to a mobile device comprising a SIM with a unique subscriber identity which corresponds to its IMSI. This IMSI, or primary profile, is used to identify this communication device in its home or primary network, i.e. the network the user is a subscriber of. The primary profile is associated to the unique number MSISDN as explained before, and which is the mobile phone number, i.e. the number through which the device can be reached. When roaming outside its primary network, the network will be referred to a visited network. This illustration is in no way a limitation of the scope of the present method and system as communication devices such as fixed devices or communication devices behind a PBX (Private Branch eXchange).

Furthermore, what will be referred to as a "call" in this description may be a standard voice call or any other communication session established between a first party, referred to as the first user, or the calling user, and another party referred to as the second user, or the called user. One will understand of course that the call is placed more precisely between the users telecommunication devices, i.e. the calling device and the called device, for instance a video call between the first and second users, or data exchange between devices. Each side of the call in the telecommunication network will be referred to a branch or a leg of the call. The call may also be referred to as a communication path between the two devices. When a communication path is set up between both calling and called devices, different entities of the present telecommunication system are involved and this path generally involves a two level exchange mechanism:

- a signaling level corresponding to the signaling (or set up) messages exchanges through the network entities between the two devices,
- a media level for handling data, voice, . . . .

Furthermore, the calling and called devices will also be referred to as end points as they represent both ends to the communication path.

In addition, it should be expressly understood that the drawings are included for illustrative purposes and do not represent the scope of the present system.

FIG. 1 shows an exemplary embodiment of the present system. A first device, or first end point, 100 comprising a primary profile to identify itself in its home network, or when roaming in a visited network. The first device 100 further comprises a plurality of additional profiles that the user can select to place a call using the selected profile as the Caller ID. When placing a call, the first device is referred to as the calling device. In the hereafter description the profile will also be referred to as the phone number for simplification purposes.

In the exemplary embodiment of a GSM or UMTS network, a device is associated to the unique IMSI in its subscriber network as explained before. The Caller ID is generally the MSISDN associated to this IMSI. Depending on the type of network the Caller ID could be a different identifier for the calling device. It could be for instance metadata associated to the user, like a picture or details information about this user such a name and address, depending on the possibility offered by the network as well as the consent of the user. The term Caller ID will encompass these different possibilities.

The device 100 is illustrated here with a plurality of profiles, identified by a line number, and what that number corresponds to. An application may be available on the device 100 to manage, i.e. create, edit, delete, . . . the different profiles. The management of the available profiles may for instance be accessible to the user through a user interface 102 as illustrated in FIG. 1.

A second device 120 or second end point is also provided in the present network. When receiving the call, the second device will be referred to as the called or recipient device. One may note that the called device 120 may be any type of device, such as a mobile, a land or fixed line, . . . .

The present system also comprises a profile service platform 110 (PSP). This profile service platform 110 may:
  provide to the user of device 100 further management of his profiles,
  process a call from the calling device 100 so that the user of this device can present a selected profile to the called device 120,
  process a reversed call, i.e. a call from the end point 120 to one of the profiles of end point 100, so that the user of this device 100 receives the call on this unique device.
Profile service platform 110 may comprise:
  a profile manager (PMN) part or node 111 to manage the different profiles from the user. As explained here after, this profile manager node 111 may also handle the initial phase of the call setup between the two devices 100 and 120. As the present method may be offered through a profile management service, the profile manager node may be in charge of handling the subscription to this service for any users who wants the possibility of handling a plurality of different profiles into one single communication device. As explained later on, a device agent may be downloaded from the profile manager node 111 to the device 110 so that this device can implement the present method, thereby providing the profile management to the user,
  a call control (CCM) part or module 112 to handle the communication path between the two devices 100 and 120. Such a node may be in charge of feature and service invocation following. This module further handles call setup and media mixing in communications. This module is a known module in today telecommunication networks and may be characterized through 2 main functions:
  a) a Call Control function that corresponds to the central function of a telephone switch. Call control offers different features such as decoding addressing information and routing telephone calls from one end point to another. It also creates added features such as "Call Waiting", "Call Forward on Busy", and "Do Not Disturb". This function handles the signaling level mentioned before in regards to the communication between the two devices,
  b) a Media function to handle the entire media part of a communication between two end points. This function corresponds to the over level, i.e. the media level mentioned before.

In actual implementation of the call control module, the media function may not be part of the actual call control module but controlled by said call control module nonetheless.

One may note that illustrating the profile service platform 110 as comprising two parts is in no way limiting as these two parts could be hosted by the same node or server, or being operatively linked to each other. The two part presentation helps to illustrate the different tasks performed by the profile service platform 110 in the present system.

Figure 2:
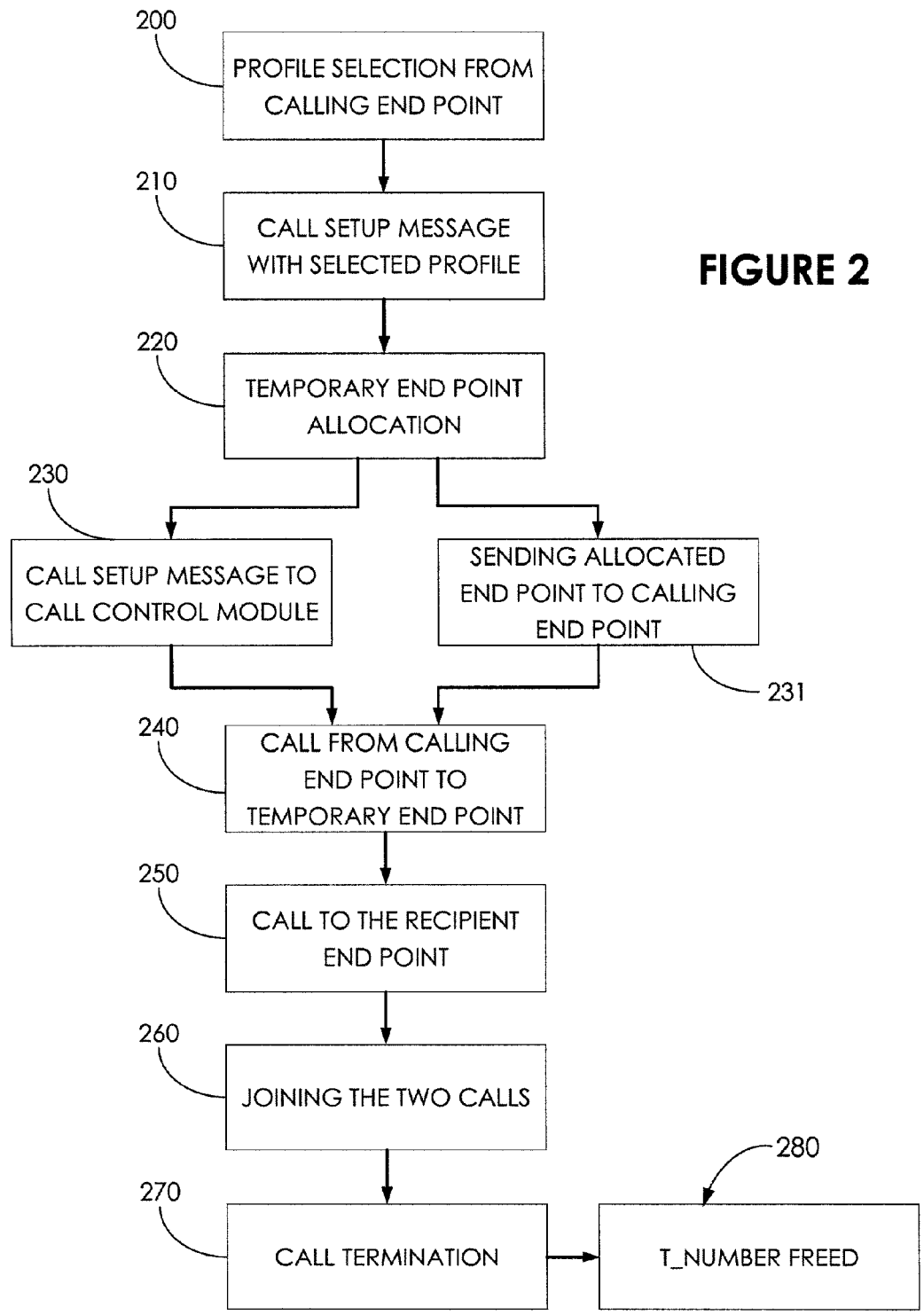
FIG. 2 is a flow chart illustrating an embodiment of the present method.

FIG. 2 is a flow chart illustrating an exemplary embodiment of the present method, wherein the first device places a call to the second device using a selected profile.

In a preliminary act 200, the calling device, with a plurality of profiles available thereon may select one profile to place a call. The selected profile will be the Caller ID for the outgoing call from device 100 thanks to the present method. For instance, as illustrated in FIG. 1, the user of the calling device 100 has 4 Lines (i.e. profiles) available on this device. Each line has a unique phone number associated with it (e.g. mobile, office, home, and dating numbers). The user has therefore the liberty to select any line of these 4 lines and then place an outgoing call using the selected profile. If this users selects Line 3 and calls the user of the recipient end point 120, the Line 3 Caller ID will appear on the recipient end point, the called user thinking the call is initiated from user 1 home device.

Once a profile is selected, the user will place a call to the called device 120. As the user dials the number to reach the second user, his device will actually sent a call setup message to the profile manager node 111, the call setup message comprising the selected profile. This corresponds to the "setup 1" message in FIG. 1. As mentioned before, the first user may be a subscriber of the profile management service, and in an additional act of the present invention (not shown in FIG. 2), an authentication act may be carried either previously or simultaneously with the "setup 1" message. This may be for instance implemented using the first user primary profile that is either passed on to the profile manager node 111 before the "setup 1" message or in this message parameters. Provided the first user is authenticated as a subscriber to the service, the present method will not be stopped.

In a further act 220, the profile manager node will allocate a temporary end point 150 as illustrated in FIG. 1. This temporary end point corresponds to addresses in the present system that are rendering available for temporary uses. This temporary end point (referred to here after as T_NUMBER) is used as an intermediary end point used to facilitate the communication path between the two devices 100 and 120. These temporary end points are known both from the profile manager node 111 and the call control module 112. They may be allocated by one or the other, and are reserved end points for the present system, so that the call control module 112, as explained here after can recognize a call placed to one of these temporary end points.

Furthermore, these temporary end points are chosen so that any call placed to them will be handled by the call control module 112. For instance the profile service platform 110 may be hosted in a given network operated by Operator A. As the call control module 112 handles the call control function for this given network, the allocated temporary end points may be a reserved pool 115 of local phone numbers to this network. In the illustration of FIG. 1, the pool 115 is operatively linked to profile manager node 111, but may as well be provided by the call control module to the profile manager node on a request per request basis (i.e. each time a first device 100 is placing a call using a selected profile).

Any call placed to these temporary end points will be processed by the call control module 112. As explained here after, the call control module 112 can, through its different features, may process the calls to the temporary end points to facilitate the call from the first to the second devices.

In a further act 230, the profile manager node 111 will inform the call control module 112 that a temporary end point has been allocated to a call being currently placed from the first device to the second device using the selected profile. This setup message, illustrated as "setup 2" in FIG. 1 between the profile manager node and the call control module, will comprise at least 3 parameters:
- the selected profile, as the Caller ID to present to the recipient end point,
- the recipient end point contact data, this may for instance be its phone number,
- the temporary end point allocated for the call. The temporary end point may be identified through its contact data in the present system. Other way to identify the allocated temporary end point may be readily available to the person skilled in the art as both the profile manager node 111 and the call control module 112 have a common knowledge of these temporary end points.

One may note at this point that an identifier for the first device is not needed and that the first device, as explained here after will be identified by the call control module through the allocated temporary end point.

In an additional act 231, which may be carried out either prior to act 230, simultaneously or after said act, the profile manager node 111 will inform the first device that the temporary end point T_NUMBER has been allocated for its call to the second device. This may be carried out through a set up message "setup 3" as illustrated in FIG. 1, this setup message comprising contact data for the allocated temporary end point. These contact data may be for instance a phone number to contact the temporary end point.

In a further act 240, once the first device 100 is informed of the allocated temporary end point, it will place a call to this allocated temporary end point, using the received contact data for said temporary end point. This may be initiated through a setup message "setup 4" as illustrated in FIG. 2

As all temporary end points are known from call control module 112, this module, through its call control function in the present system, will process this first call from the first device to the allocated temporary end point. Thanks to the act 230 and "setup 2" message, call control module 112 can identify the call to this temporary end point as a first leg of the call between the first and second devices. This "awareness" of all temporary end points is illustrated with the large arrow between T_NUMBER 150 and call control module 112 in FIG. 1.

Once the first call is processed, the call control module 112 will in a subsequent act 250 place a call to the recipient end device, known from the "setup 3" message of act 230. This second call may be initiated through "setup 5" message as illustrated in FIG. 1. This call management node 112 will process this second call to the recipient end point using the selected profile as the Caller ID. Indeed, call control module 112, through its call control function, is adapted to process a call, and choose or change the Caller ID for a call. The recipient end point will receive the second call with the selected profile as the Caller ID. This second call corresponds to the second first leg of the call between the first and second devices.

Once the second user picks up the call, the call control module 112 will, in a subsequent act 260, call control module 112 will joint the two calls to generate a call from the calling end point to the recipient end point. Thus the two call legs will form one communication path between end points 100 and 120. This may be initiated through "setup 6" message, as illustrated in FIG. 1.

If either one of the ends points 100 and 120 hangs up, a further setup message "setup 7" will terminate the call in the present system, as in act 270. After the call termination, T_NUMBER will be freed and join the pool of available temporary end points for further allocation in a subsequent act 280. A record ("setup 8" message) of the call may be generated for subsequent billings of the calling end point 100.

In the present illustration, the setup messages may be for instance exchanged through data connection between the different entities. The different setup messages are used for setting up the communication path between the two end points. Once the two call legs are joined, in act 260, the actual call (as illustrated in dotted line between the two end points 100 and 120, and going through call control module 112), i.e. the media level of the call, will be handled by call control module 112. In other words, the communication path will go through call control module 112.

One may note that thanks to the present method, the first user may not be aware that acts 210 to 240 are carried out while he is simply calling the recipient end point. Similarly, the second user is not aware that the first user has changed the Caller ID for the call.

In the present system, the device 100 may be adapted to carry the different, acts 200, 210, and 240 through an agent running on this device. This agent may for instance be downloaded from the profile manager node 111 when registering to the profile management service. This agent will for instance allow:
- the user to manage different profiles, as illustrated in FIG. 1 through a user interface 102, offering an "edit", "add", and "delete" functions. Other function may be available to the user to offer more flexibility to his profile management. For instance, the user may chose to activate or deactivate a profile. When activated, all incoming call to this profile will be forward to the user device 100. When deactivated, these call will follow a normal routing to the profile number,
- send update messages to the profile manager node 111 so that this node 111 can store a database of profiles available to the user,
- send the setup 1 message,
- process the "setup 3" message with the contact data for the temporary end point,
- place a call to T_NUMBER after receiving the "setup 3" message.

For each user (e.g. subscriber to the profile management service), the profile manager node 111 may keep a database listing their different profiles as illustrated in FIG. 1. The primary profile, e.g. the IMSI for the first device, is also stored, so that the call control module 112 can call this device in case of an incoming call as illustrated here after in FIGS. 3 and 4.

TABLE 1 database for the profile manager node 111

| Profile name | Profile number | Active profile | Primary profile |
|---|---|---|---|
| Line 1 | +1 650 442 47 98 | Yes | No |
| Line 2 | +1 303 442 47 98 | No | No |
| Line 3 | +1 800 446 47 98 | Yes | Yes |
| Line 4 | +1 650 600 47 98 | No | No |

Figure 3:
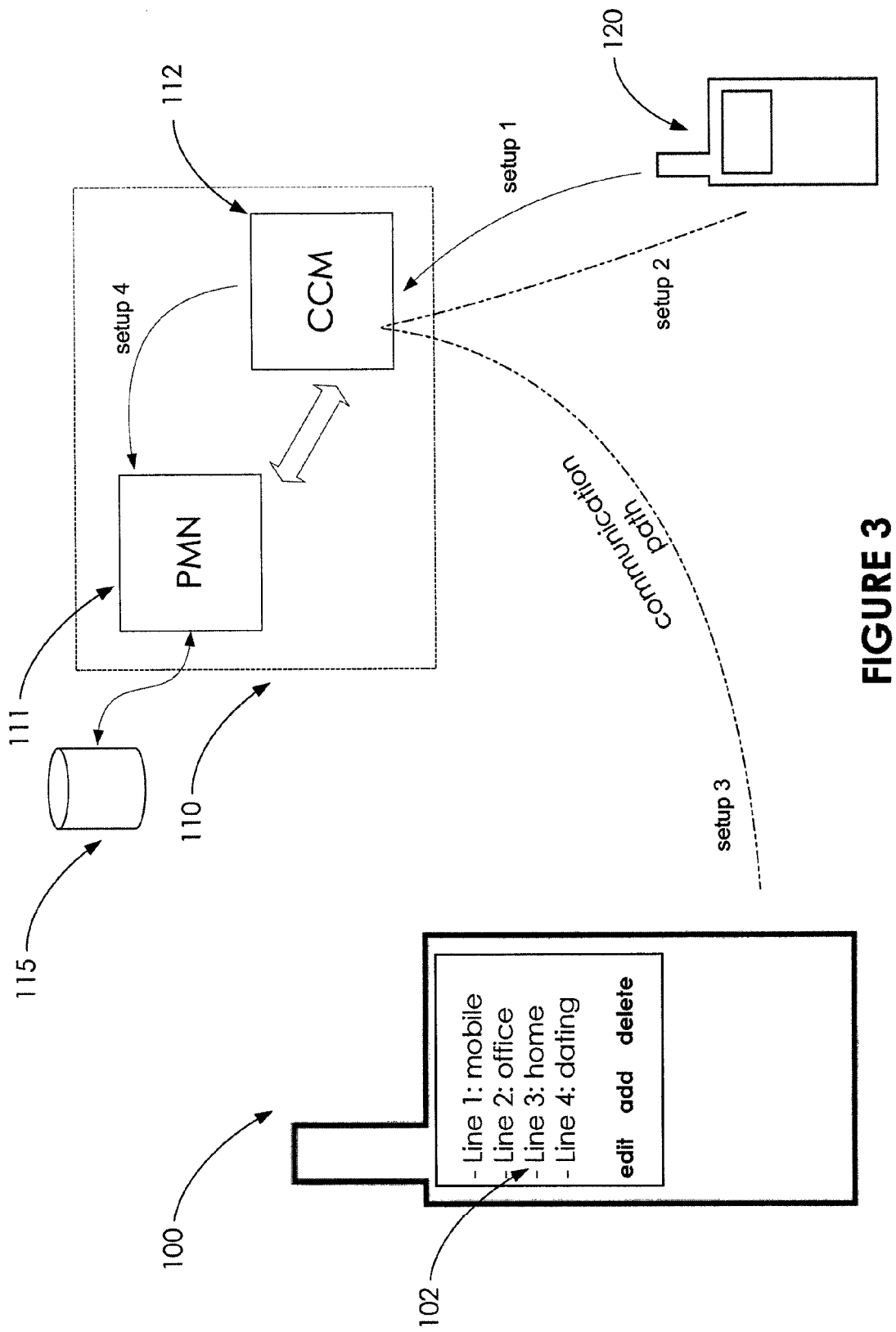
FIG. 3 shows an illustrative embodiment of the present system.

The present method also allows the first device to receive calls placed to its different profiles. FIG. 3 is an illustration of the present system, when the second device 120 is the calling device, and the first device 100 is the recipient device. The second user may want to call the first user on one of his profiles, like his office line.

Figure 4:
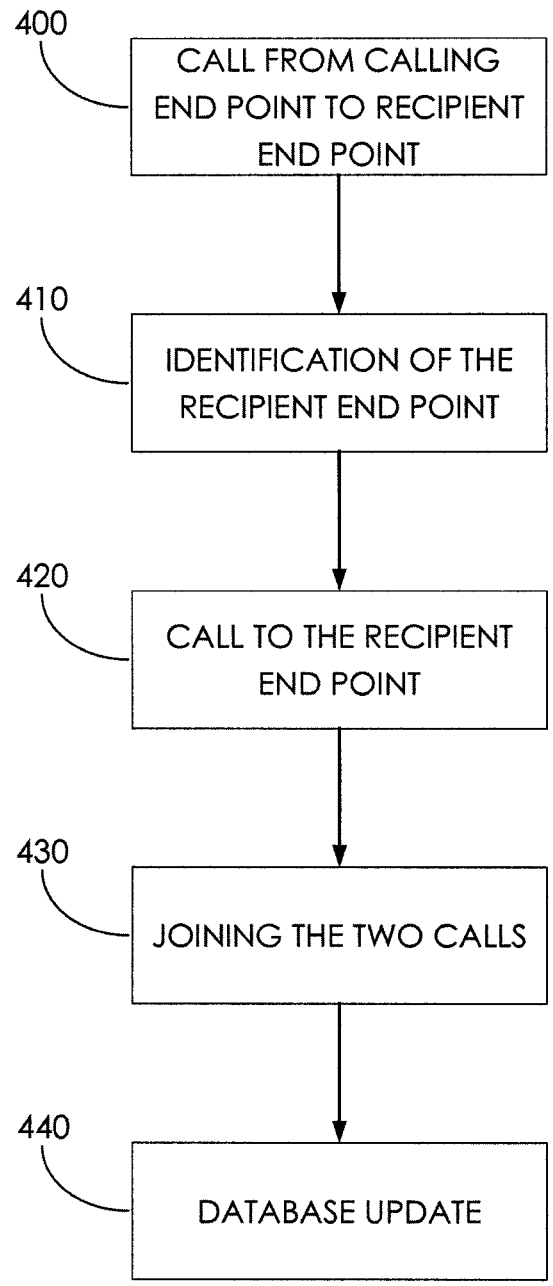
FIG. 4 is a flow chart illustrating an embodiment of the present method.

This method corresponding to this reversed situation is illustrated in FIG. 4. In a preliminary act 400, once the second user has selected the profile CALLED_PROFILE he wants to call, he places a call using device 120 to device 100. A setup message "setup 1" is forwarded to the call control module 112. This message is forwarded for instance by the second user carrier (i.e. his network operator) to call control module 112. This setup message "setup 1" comprises the chosen profile CALLED_PROFILE used to contact the first user.

If the first user is a subscriber to the present profile management service, call control module—through the profile CALLED_PROFILE—will be able to identify the first user using "setup 1 message". Indeed, in a further act 410, call control module 112 will identify the first user checking in the profile manager node database 115 the primary profile matching the profile CALLED_PROFILE. The large arrow in FIG. 3 illustrates the call control module 112 checking in the profile manager node database 115 whether CALLED_PROFILE is a known profile and which user it is associated with. As illustrated in Table 1, if CALLED_PROFILE is a phone number for instance, call control module 112 can retrieve the first device primary profile number (Line 3 in the example of Table 1). If the second user is calling the first user on his primary profile, the identification may be even more straightforward as the profile chosen by the second user will comprise for instance the first user primary MSISDN.

In an additional embodiment of the present method, if the first user has set the CALLED_PROFILE to inactive (through e.g. an update message to the profile manager node 111), call control module 112 will see this profile as inactive, meaning that the user does not want to receive any incoming call to this profile on device 100. The call will be handled in a normal way, i.e. forwarded to the number corresponding to the CALLED_PROFILE, on a different device than the first device 100.

As the recipient end point is identified in act 410, a first leg of the call between the calling end point and the recipient end point is processed by the call control module 112.

In a further act 420, call control module 112 will call the first device 100 primary profile (Line 3 in the example of Table 1), as identified from the profile manager node database 115. The call will be initiated through a "setup 2" message as illustrated in FIG. 3. A second leg of the call is thus process through this act 420.

In a further act 430, call management node will further join the two legs, in a similar way to act 260 of FIG. 2. This is illustrated through the cal "setup 3" message in FIG. 3 and the dotted line showing the communication path formed by the two call legs. As shown FIG. 3, the media level of the call is handled by call control module 112, i.e. the communication path goes through call control module 112.

When the call is set between the two devices, the first device may further be arranged, through the user interface 102, to show the Caller ID from the calling end point and the CALLED_PROFILE to inform the first user of who is placing the call as well as which profile is the called profile.

A "setup 4" massage may be exchanged from the call control module 112 to the profile manager node 111 for authentication, accounting and billing purpose. The call may be terminated in a subsequent act (not shown in FIG. 4).

If the first user does not want one of his profile, e.g. his work profile, to be activated in the present method, he may through the agent mentioned here above deactivate this profile. Any call placed to the deactivated profile, as mentioned before, will be processed normally, i.e. routed to the relevant recipient device corresponding to the deactivated profile.

Thanks to the present system, a user can enjoy a plurality of profiles on his first device 100. Profiles can be created using existing numbers, as a mobile number, a home number, a work number. Additional numbers may be provided to the user through for instance the profile management service. The user can associate these numbers with different user created profiles, e.g. a dating profile, an Ebay® profile, a Match.com® profile, a given friend profile, i.e. a profile unique to a friend, and which is only known by this friend. Some of these numbers, which may be seen as disposable, i.e. allocated to the user on a temporary basis, may be distributed knowing their temporary validity.

The present system also bring enhanced confidentiality has the user does not have to give his primary number. You may further separate billings per profiles or filter calls on a profile basis.

In the description here above, the call control module and profile manager node may be seen as two subsystems or functions of the profile service platform. This platform could indeed implement both functions into one single application.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specifications and drawings are to be regarded in an illustrative manner and are not intended to limit the scope of the appended claims.

In interpreting the appended claims, it should be understood that:

a) the words "comprising" or "including" do not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analogue and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method comprising:
providing to a recipient end point a caller identification or CID from a calling end point, the calling end point comprising a default CID and at least one profile, said profile corresponding to an additional CID, wherein providing comprises, for a profile service node, acts of:
receiving a call setup message from the calling end point, the call setup message comprising the profile and corresponding to a requested call from the calling end point to the recipient end point,
in response to receiving the call setup message, allocating a temporary end point for the requested call, wherein the temporary end point comprises corresponding contact data with which the calling end point can reach the temporary end point by placing a call to the temporary end point,
in response to receiving the call setup message, sending the contact data for the allocated temporary end point to the calling end point,
processing a first call from the calling end point to the temporary end point made using the contact data, and identifying the first call as a first leg of the requested call from the calling endpoint to the recipient end point,
processing a second call to the recipient end point using the additional CID as the calling CID, the second call being processed as a second leg of the requested call from the calling endpoint to the recipient end point, and
joining the first and second calls to complete the requested call from the calling end point to the recipient end point.

2. The method of claim 1, the calling end point comprising a default CID and at least one additional CID.

3. A calling end point for providing to a recipient end point a caller identification or CID from said calling end point, the calling end point comprising:
a default CID and at least one additional CID,
the calling end point being configured to:
select one of the additional Caller IDs, and
send a call setup message, the call setup message comprising the selected additional CID and corresponding to a requested call from the calling end point to the recipient end point,
in response to sending the call setup message receive contact data with which the calling end point can contact a temporary end point, which is allocated for a first leg of the requested call, and
in response to receiving the contact data, place a call to the temporary end point using the contact data, for connection to the recipient endpoint through a second leg made between the temporary endpoint and the recipient endpoint, without the calling endpoint placing a call directly to the recipient endpoint.

4. A profile service node configured to provide to a recipient end point a caller identification or CID from a calling end point, the calling end point comprising a default CID and at least one profile, said profile corresponding to an additional CID, the profile service node being configured to:
receive a call setup message from the calling end point, the call setup message comprising the profile and corresponding to a requested call from the calling end point to the recipient end point,
in response to receiving the call setup message, allocate a temporary end point for the requested call, wherein the temporary end point comprises corresponding contact data with which the calling end point can reach the temporary end point by placing a call to the temporary end point,
in response to receiving the call setup message, send the contact data for the temporary end point to the calling end point,
process a first call from the calling end point to the temporary end point using the contact data, and identify the first call as a first leg of the requested call from the calling endpoint to the recipient end point,
in response to identifying the first call as the first leg, process a second call to the recipient end point using the additional CID as the calling CID, the second call being processed as a second leg of the requested call from the calling endpoint to the recipient end point, and
join the first and second calls to complete the requested call from the calling end point to the recipient end point.

5. A telecommunication system comprising:
a recipient end point,
a calling end point, the calling end point comprising a default CID and at least one profile, said profile corresponding to an additional CID, and
a profile service node for providing to the recipient end point a caller identification or CID from the calling end point,
the calling end point being configured to:
select one of the at least one profiles,
send a call setup message to the profile service platform, the call setup message comprising the selected profile and corresponding to a requested call from the calling end point to the recipient end point,
in response to sending the call setup message, receive contact data with which the calling end point can contact a temporary end point, which is allocated by the profile service node for the requested call, and
in response to receiving the contact data, place a first call to the temporary end point using the contact data,
the profile service node being configured to:
receive the call setup message from the calling end point,
in response to receiving the call setup message, allocate the temporary end point for the requested call,
send the contact data for the temporary end point to the calling end point,
process the first call from the calling end point to the temporary end point, and identify the first call as a first leg of the requested call from the calling endpoint to the recipient end point,
in response to identifying the first call as the first leg, process a second call to the recipient end point using the additional CID as the calling CID, the second call being processed as a second leg of the requested call from the calling endpoint to the recipient end point, and
join the first and second calls to complete the requested call from the calling end point to the recipient end point.

6. A non-transitory computer readable medium comprising an application embodied thereon and arranged to provide to a recipient end point a caller identification or CID from a calling end point, the calling end point comprising a default CID and at least one profile, said profile corresponding to an additional CID, the application comprising:
a portion to receive a call setup message from the calling end point, the call setup message comprising the profile and corresponding to a requested call from the calling end point to the recipient end point,
a portion to, in response to receiving the call setup message, allocate a temporary end point for the requested call, wherein the temporary end point comprises corresponding contact data with which the calling end point can reach the temporary end point by placing a call to the temporary end point, a portion to send, in response to receiving the call setup message, the contact data for the allocated temporary end point to the calling end point, a portion to process a first call from the calling end point to the temporary end point made using the contact data, and identify the first call as a first leg of the requested call from the calling endpoint to the recipient end point, a portion to, in response to identifying the first call as the first leg, process a second call to the recipient end point using the additional CID as the calling CID, the second call being processed as a second leg of the requested call from the calling endpoint to the recipient end point, and a portion to join the first and second calls to complete the requested call from the calling end point to the recipient end point.

7. A non-transitory computer readable medium comprising an application embodied thereon and arranged to provide to a recipient end point a caller identification or CID from a calling end point, the calling end point comprising a default CID and at least one profile, said profile corresponding to an additional CID, the application comprising:

a portion to select one profile, a portion to send a call setup message, the call setup message comprising the selected profile and corresponding to a requested call from the calling end point to the recipient end point, a portion, in response to sending the call setup message, to receive contact data with which the calling end point can contact a temporary end point, which is allocated for a first leg of the requested call, and a portion, in response to receiving the contact data, to place a call the temporary end point using the contact data, for connection to the recipient endpoint through a second leg made between the temporary endpoint and the recipient endpoint, without the calling endpoint placing the call directly to the recipient endpoint.

8. The method of claim 1, wherein allocating comprises:
selecting the temporary end point from a pool of a plurality of reserved temporary end points.

9. The calling end point of claim 3, wherein the temporary end point allocated for the requested call is a member of a pool of a plurality of reserved temporary end points.

10. The profile service node of claim 4, wherein the profile service node is configured to select the temporary end point that is allocated to the requested call from a pool of a plurality of reserved temporary end points.

11. The telecommunication system of claim 5, wherein:
the temporary end point is a member of a pool of a plurality of reserved temporary end points; and The profile service node is configured to select the temporary end point from the pool of reserved temporary end points.

12. The non-transitory computer readable medium of claim 6, wherein the portion to allocate is configured to select selecting the temporary end point from a pool of a plurality of reserved temporary end points.

13. The non-transitory computer readable medium of claim 7, wherein the temporary end point allocated for the requested call is a member of a pool of a plurality of reserved temporary end points.

* * * * *